US012566560B1

(12) United States Patent
Barrell et al.

(10) Patent No.: US 12,566,560 B1
(45) Date of Patent: Mar. 3, 2026

(54) CROWD BASED DATA TIERING

(71) Applicant: VDURA, Inc., San Jose, CA (US)

(72) Inventors: Michael Barrell, Longmont, CO (US);
Ian Davies, Longmont, CO (US)

(73) Assignee: VDURA, Inc., San Jose, CA (US)

( * ) Notice: Subject to any disclaimer, the term of this
patent is extended or adjusted under 35
U.S.C. 154(b) by 0 days.

(21) Appl. No.: 19/316,135

(22) Filed: Sep. 2, 2025

(51) Int. Cl.
*G06F 3/06* (2006.01)

(52) U.S. Cl.
CPC .......... *G06F 3/0638* (2013.01); *G06F 3/0604*
(2013.01); *G06F 3/0679* (2013.01)

(58) Field of Classification Search
CPC .... G06F 3/0604; G06F 3/0638; G06F 3/0622;
G06F 2201/87; G06F 12/08; G06F
2212/1024; G06F 3/0679; G06F 3/0683;
G06F 3/0647
USPC ........................................................ 711/154
See application file for complete search history.

(56) References Cited

U.S. PATENT DOCUMENTS

| | | | | |
|---|---|---|---|---|
| 2019/0339903 A1* | 11/2019 | Ainscow | ............... | G06F 3/0611 |
| 2020/0293219 A1* | 9/2020 | Szczepanik | ........... | G06F 3/0685 |
| 2023/0051781 A1* | 2/2023 | Patel | .................... | G06F 3/0611 |

* cited by examiner

*Primary Examiner* — Hashem Farrokh
(74) *Attorney, Agent, or Firm* — Fenwick & West LLP

(57) ABSTRACT

A method or system for managing data placement in multi-tier storage devices. The system monitors usage of data items stored across storage devices, each associated with a performance tier. The system collects usage metrics for the data items, including access frequency, recency, file size, growth rate, sequentiality, or temporal access patterns. Multiple tiering methods are executed in parallel, with each method analyzing at least a subset of the usage metrics to generate tiering recommendations. These recommendations indicate whether each data item should be promoted to a higher-performance tier, demoted to a lower-performance tier, or retained in its current tier. The system aggregates the outputs of the tiering methods to compute a consensus decision for each data item. Based on the consensus, the system relocates data items to appropriate storage tiers.

20 Claims, 10 Drawing Sheets

800

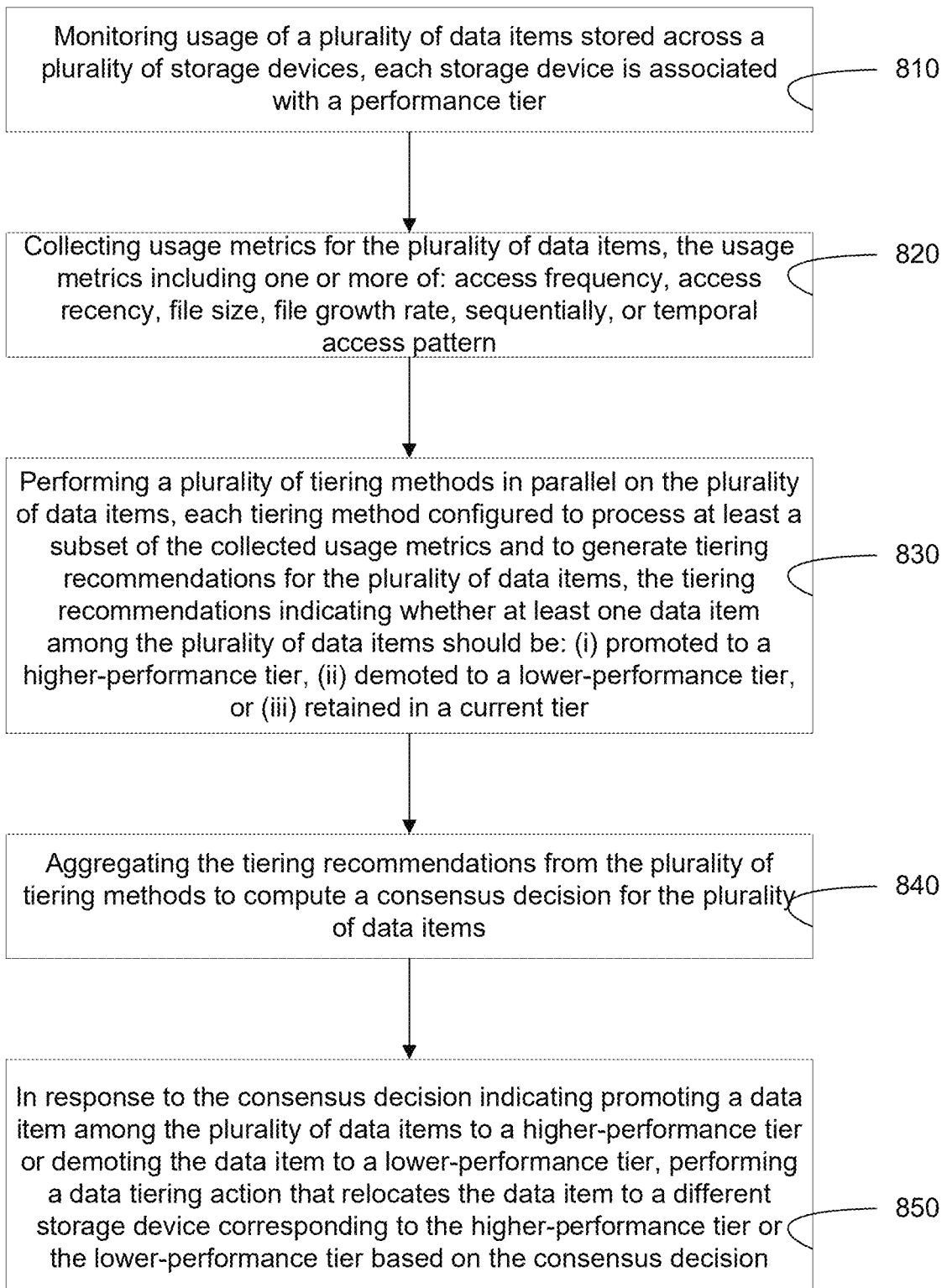

Monitoring usage of a plurality of data items stored across a plurality of storage devices, each storage device is associated with a performance tier — 810

Collecting usage metrics for the plurality of data items, the usage metrics including one or more of: access frequency, access recency, file size, file growth rate, sequentially, or temporal access pattern — 820

Performing a plurality of tiering methods in parallel on the plurality of data items, each tiering method configured to process at least a subset of the collected usage metrics and to generate tiering recommendations for the plurality of data items, the tiering recommendations indicating whether at least one data item among the plurality of data items should be: (i) promoted to a higher-performance tier, (ii) demoted to a lower-performance tier, or (iii) retained in a current tier — 830

Aggregating the tiering recommendations from the plurality of tiering methods to compute a consensus decision for the plurality of data items — 840

In response to the consensus decision indicating promoting a data item among the plurality of data items to a higher-performance tier or demoting the data item to a lower-performance tier, performing a data tiering action that relocates the data item to a different storage device corresponding to the higher-performance tier or the lower-performance tier based on the consensus decision — 850

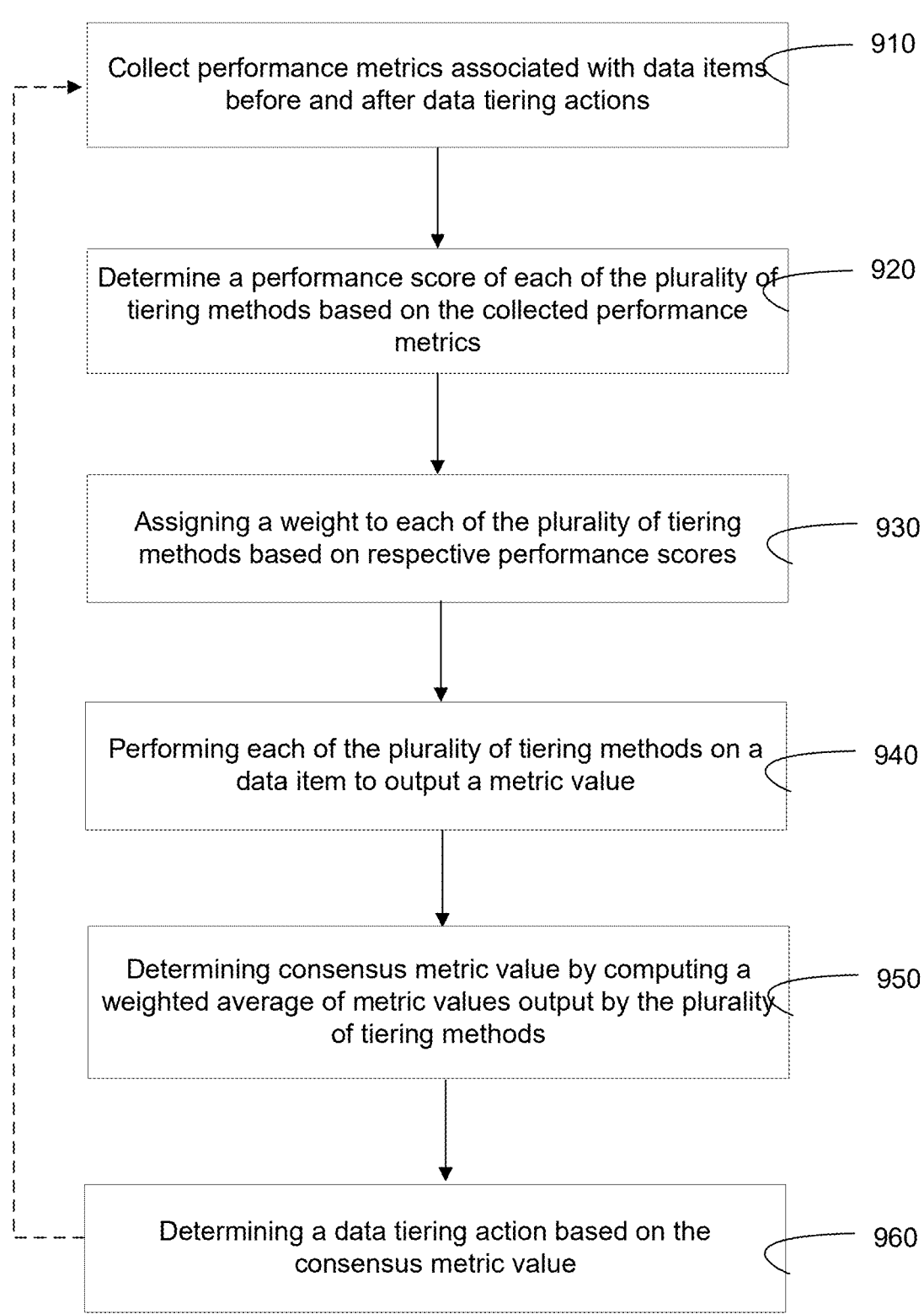

Collect performance metrics associated with data items before and after data tiering actions — 910

Determine a performance score of each of the plurality of tiering methods based on the collected performance metrics — 920

Assigning a weight to each of the plurality of tiering methods based on respective performance scores — 930

Performing each of the plurality of tiering methods on a data item to output a metric value — 940

Determining consensus metric value by computing a weighted average of metric values output by the plurality of tiering methods — 950

Determining a data tiering action based on the consensus metric value — 960

FIG. 9

CROWD BASED DATA TIERING

BACKGROUND

1. Field of the Disclosure

The present disclosure relates to storage systems and more specifically to crowd-based data tiering.

2. Description of Related Art

In modern storage systems, data can be stored across a range of media types, each offering distinct characteristics in terms of access latency, throughput, durability, and scalability. Tiered storage architectures leverage these differences by classifying storage media into performance tiers. Higher tiers typically consist of media with faster access times and higher throughput capabilities, whereas lower tiers utilize media with comparatively slower performance but greater storage density or suitability for long-term retention.

For example, magnetic tape systems, such as linear tape-open (LTO), are well suited for archival storage due to their long-term durability and ability to retain large volumes of infrequently accessed data. While these systems exhibit relatively high latency and slower seek performance, they are frequently used for cold storage applications, regulatory data retention, and disaster recovery scenarios where immediate access speed is not a primary concern.

Solid-state drives (SSDs) represent a class of non-volatile memory technology that offers significantly lower access latencies and higher input/output operations per second (IOPS) compared to traditional magnetic storage. SSDs store data in semiconductor memory cells—typically NAND flash—and contain no mechanical components, which contributes to their faster read/write performance, lower power usage, and increased physical resilience. These characteristics make SSDs ideal for storing hot data, such as frequently accessed content in transactional databases, virtualized environments, and real-time analytics platforms. Owing to these performance advantages, SSDs are commonly placed in the upper tiers of a tiered storage hierarchy.

Hard disk drives (HDDs), on the other hand, utilize rotating magnetic platters and mechanical read/write heads to store data. This design results in higher latency and lower IOPS compared to SSDs, but HDDs are capable of delivering high storage capacity and are suitable for workloads involving moderately accessed data. As such, HDDs are often used to store warm data-information that requires consistent availability but does not demand the high throughput or low latency of SSDs. In tiered storage systems, HDDs often serve as a middle tier between fast, low-latency SSDs and archival storage solutions.

Storage systems must therefore manage trade-offs among performance characteristics, data access patterns, and storage density. High-performance storage media like SSDs offer quick access and responsiveness, which are critical for certain applications, but may not be optimal for storing large volumes of infrequently used data. Conversely, media types designed for high capacity or long-term retention may not deliver the performance needed for latency-sensitive workloads. Tiered architectures are designed to balance these competing factors by aligning data placement with workload requirements and media characteristics.

SUMMARY

The present disclosure relates to systems and methods for managing data placement in a multi-tier storage environment. In particular, it provides a computer-implemented method that dynamically determines optimal storage tier assignments for data items based on an ensemble of tiering methods operating in parallel.

The method includes monitoring usage of a plurality of data items stored across storage devices associated with different performance tiers, and collecting usage metrics such as access frequency, recency, file size, growth rate, sequentiality, and temporal access patterns. A plurality of tiering methods are executed in parallel, each processing a subset of the collected metrics to generate numeric tiering recommendations indicating whether each data item should be promoted, demoted, or retained. These recommendations, output as values within a bounded range, are aggregated—optionally via a weighted average—to produce a consensus decision for each data item.

The consensus is then used to trigger tiering actions that relocate data to the appropriate performance tier. Performance metrics may be collected before and after tiering actions to evaluate the effectiveness of individual tiering methods, enabling dynamic adjustment of method weights in the aggregation process. The system may further track trends in consensus decisions over time and incorporate user-defined policies to adjust thresholds or migration frequency. Tiering actions may be scheduled asynchronously to minimize interference with ongoing data access.

This approach provides a flexible, extensible, and adaptive framework for data placement optimization, improving performance and cost-efficiency across heterogeneous storage infrastructures.

BRIEF DESCRIPTION OF THE DRAWINGS

The teachings of the embodiments can be readily understood by considering the following detailed description in conjunction with the accompanying drawings.

FIG. 8 is a flowchart of an example method for managing data placement in a multi-tier storage system, in accordance with one or more embodiments.

FIG. 9 is a flowchart of another example method for managing data placement in a multi-tier storage system, in accordance with one or more embodiments.

Figure 1:
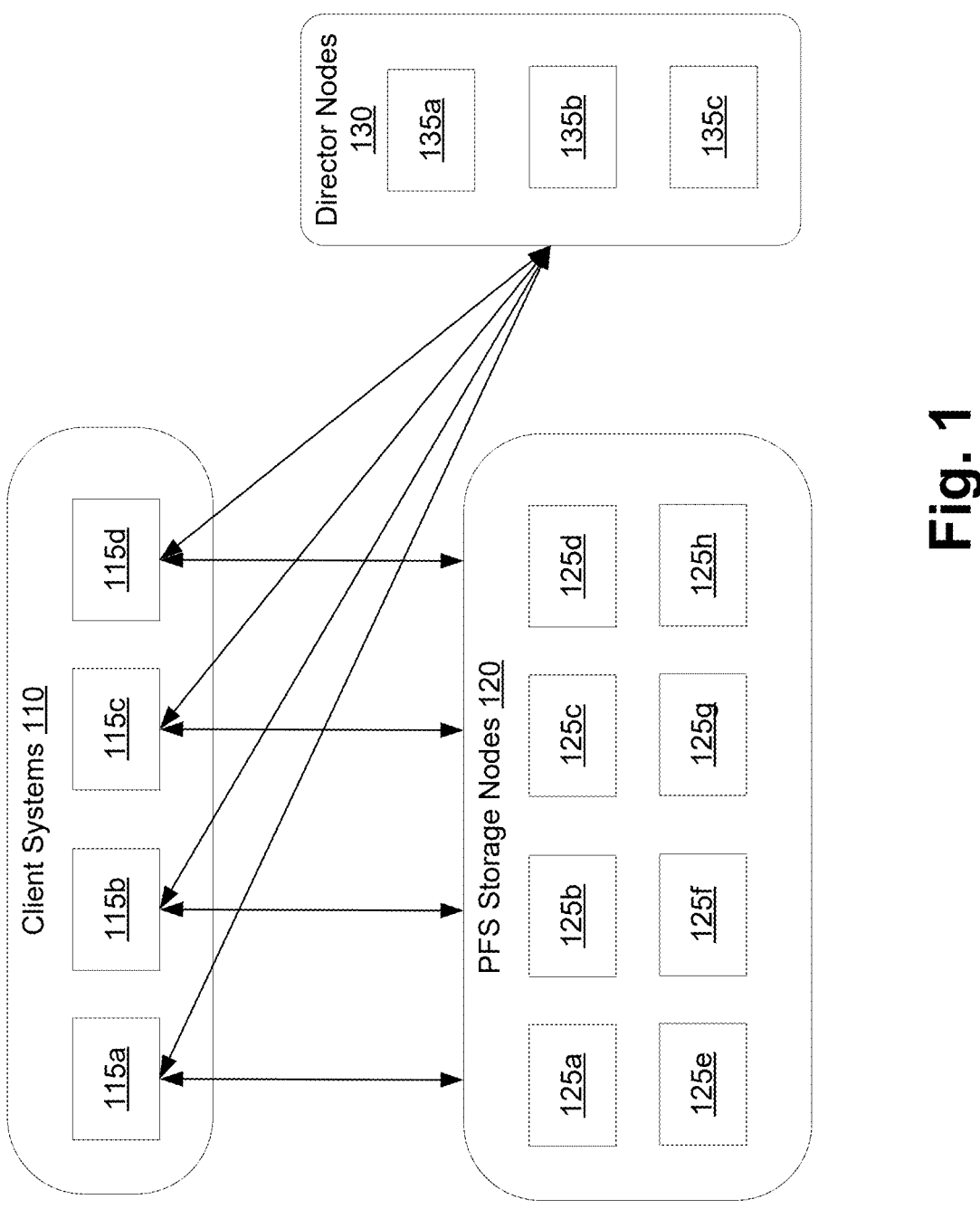
FIG. 1 illustrates various components in the system environment of a storage system, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

Conventional data tiering systems typically rely on a single predefined algorithm or heuristic to determine when and where data should be moved across storage tiers. These systems often make placement decisions based on a narrow set of criteria—such as access frequency or recency of use—and are configured statically or with limited adaptability. As a result, they suffer from several significant limitations. First, no single algorithm is universally effective across all workloads; a strategy that performs well for one usage pattern may perform poorly for another. Second, traditional systems lack the flexibility to incorporate diverse and evolving contextual factors, such as burstiness, sequentiality, or workload-specific temporal behaviors. Third, many conventional systems are reactive and coarse-grained, triggering data movement only after significant delays or thresholds have been met, resulting in suboptimal placement and degraded performance during transitions. Finally, efforts to create "adaptive" algorithms still tend to generalize poorly and are difficult to tune for heterogeneous environments.

Embodiments described herein overcome these deficiencies by employing a multi-algorithm ensemble approach that integrates multiple, diverse tiering algorithms operating in parallel. Each algorithm is configured to analyze different aspects of workload behavior, leveraging distinct metrics and evaluation strategies. For example, one algorithm may consider file size and access frequency, while another may focus on temporal access patterns or adjacency to other frequently accessed files. Each algorithm outputs a normalized score or recommendation, such as to move data to a higher or lower tier or retain it in place. These individual outputs are aggregated using ensemble techniques—such as averaging, weighted voting, or threshold comparison—to produce a consensus decision that reflects the collective insight of the ensemble.

By leveraging the "wisdom of the crowd" across algorithmic outputs, the system achieves a higher degree of generality, robustness, and adaptability than any single algorithm alone. The ensemble-based system can respond more effectively to changing workload characteristics and is less prone to overfitting or brittleness in its placement logic. This enables more accurate and timely decisions about data movement, improving performance, reducing cost, and increasing the overall efficiency of tiered storage environments.

Additional details about the storage system are further described below with respect to FIGS. 1-9.

Example Storage System

FIG. 1 illustrates the various components in the system environment of a storage system, according to an embodiment. The system environment of the storage system includes a set 110 of client systems 115a, 115b, 115c, 115d, a set or storage nodes 125a, 125b, 125c, 125d, 125e, 125f, 125g, 125h and a set of director nodes 135a, 135b, 135c. The director nodes 135 and storage nodes 125 are computer systems that run the storage system. A client system 115 includes a client driver that is a loadable software module that interacts with the director nodes and storage nodes to read and write the files stored by the storage system. Any required administration is performed via a graphical user interface (GUI) or call level interface (CLI) running on a director node 135. All the director nodes and storage nodes work together to provide a single file system namespace referred to as a realm.

According to an embodiment, the storage system separates the control plane from the data plane. The director nodes 135 in the storage system form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the storage system storage cluster, and controlling all failure recovery and data reliability operations. According to an embodiment, director nodes 135 are commodity compute servers with a high-speed networking connection, significant DRAM capacity, and a persistent store for transaction logs.

In some embodiments, one or more of the director nodes 135a, 135b, or 135c are configured to perform data tiering. As part of the control plane, a director node 135 is configured to monitor data access activity, collecting and maintaining usage metrics for data items stored across storage nodes, and executing a plurality of tiering algorithms in parallel. As used herein, executing a plurality of tiering algorithms "in parallel" does not imply that all such algorithms must be executed simultaneously or concurrently in a strict temporal sense. Rather, the term encompasses asynchronous or staggered execution patterns in which different tiering algorithms may be triggered by different types of events or scheduled to operate at different evaluation frequencies. For example, a first algorithm may be event-driven and execute immediately upon a data access operation, such as a file read or write, while a second algorithm may be scheduled to execute periodically based on a time interval, such as hourly or daily. A third algorithm may only be triggered upon detection of significant changes in system load or storage tier utilization. Despite their independent execution timing, the outputs of these algorithms are treated as logically concurrent for purposes of consensus aggregation, wherein their respective tiering recommendations are considered together to determine whether a data item should be promoted, demoted, or retained. This flexible execution model enables the system to efficiently incorporate diverse analytical strategies without imposing unnecessary synchronization constraints.

Each algorithm processes a subset of the collected metrics and outputs a tiering recommendation. The director node aggregates these recommendations—e.g., through averaging or weighted voting—to produce a consensus decision indicating whether a data item should be promoted to a higher-performance tier, demoted to a lower-performance tier, or retained in its current tier. Based on the consensus, the director node 135 orchestrates data movement actions across the storage nodes while maintaining consistency and minimizing impact on active I/O. This division of responsibilities allows the director nodes to implement adaptive and extensible data placement strategies without interfering with data-plane operations.

In some embodiments, the director node 135 is configured to generate consensus-based tiering decisions at defined evaluation intervals, even though the individual tiering algorithms may execute at different times, frequencies, or in response to different triggering events. For example, one tiering algorithm may be configured to execute immediately upon detection of a data access event (e.g., a read or write operation), while another may operate on a scheduled basis (e.g., every 30 minutes or once daily), and yet another may be triggered by system-level conditions such as changes in device utilization or memory pressure. To accommodate these asynchronous behaviors, the system maintains a buffer or record of the most recent output from each algorithm for each data item. At each consensus evaluation cycle, the system retrieves the most recently available score from each algorithm, regardless of when it was last updated, and aggregates those scores into a consensus metric. In some embodiments, stale outputs—i.e., those older than a configured threshold—may be discounted, weighted less heavily, or excluded from the aggregation. This approach allows the consensus mechanism to operate coherently despite temporal variation among its constituent algorithms, providing consistent and up-to-date tiering decisions based on the best available insights at the time of evaluation.

Additional details about the data tiering methods and architecture of director node 135 are further described below with respect to FIGS. 5-9.

Storage nodes 120 in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

In conjunction with the control operations performed by the director nodes, the storage nodes 125a-125h are responsible for executing the data movement operations associated with tiering actions. Upon receiving a consensus tiering decision from a director node—such as to promote or demote a data item—the corresponding storage node relocates the affected data item to the target storage device associated with the designated performance tier. Each storage node may contain multiple classes of storage media, such as NVMe SSDs, capacity-optimized SSDs, and HDDs, and is capable of transferring component objects between these media types in response to tiering directives. The storage node may also periodically report local performance statistics or device-level health information back to the director nodes 130, enabling more informed tiering decisions. This coordination between the director nodes 130 and storage nodes 120 allows the system to continuously optimize data placement based on evolving workload characteristics and tier-specific capacities.

The storage system scales out both director nodes 135 and storage nodes 125. For any given configuration of the system, additional director nodes can be added for more metadata processing performance. Similarly additional storage nodes can be added for more capacity or more storage performance.

Figure 2:
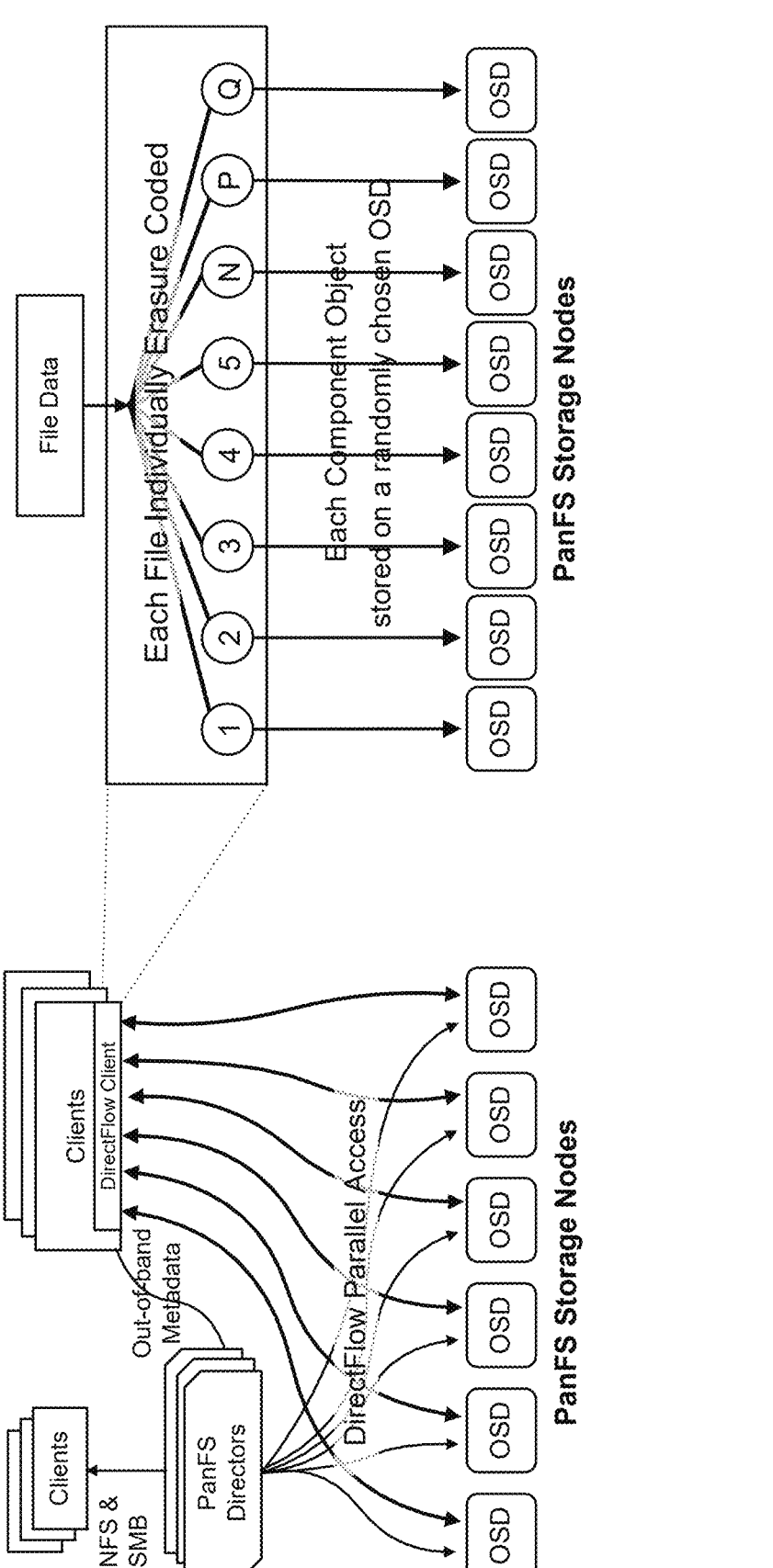
FIG. 2 illustrates how data is stored in a file in the storage system, in accordance with one or more embodiments.

FIG. 2 illustrates how data is stored in a file in the storage system, according to an embodiment. The storage system uses multiple storage nodes by assigning a map to each file. The map for a file shows where all the striped component parts of that file are located, and which storage node holds each part. The client driver uses the map to determine which storage nodes to access, directly or in parallel. In some embodiments, storage system uses network erasure coding as part of that striping to ensure data integrity and reliability.

The client driver provides the semantics of a locally-mounted, POSIX-compliant file system. The storage system ensures that if a process P2 (possibly on another compute server) is writing to a file at the same time the process P1 is reading from the file, this process P1 will not read stale data. Accordingly, storage system provides cache coherency across all the nodes running the client driver.

The storage system performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the storage system provides a consistent system performance.

Figure 3:
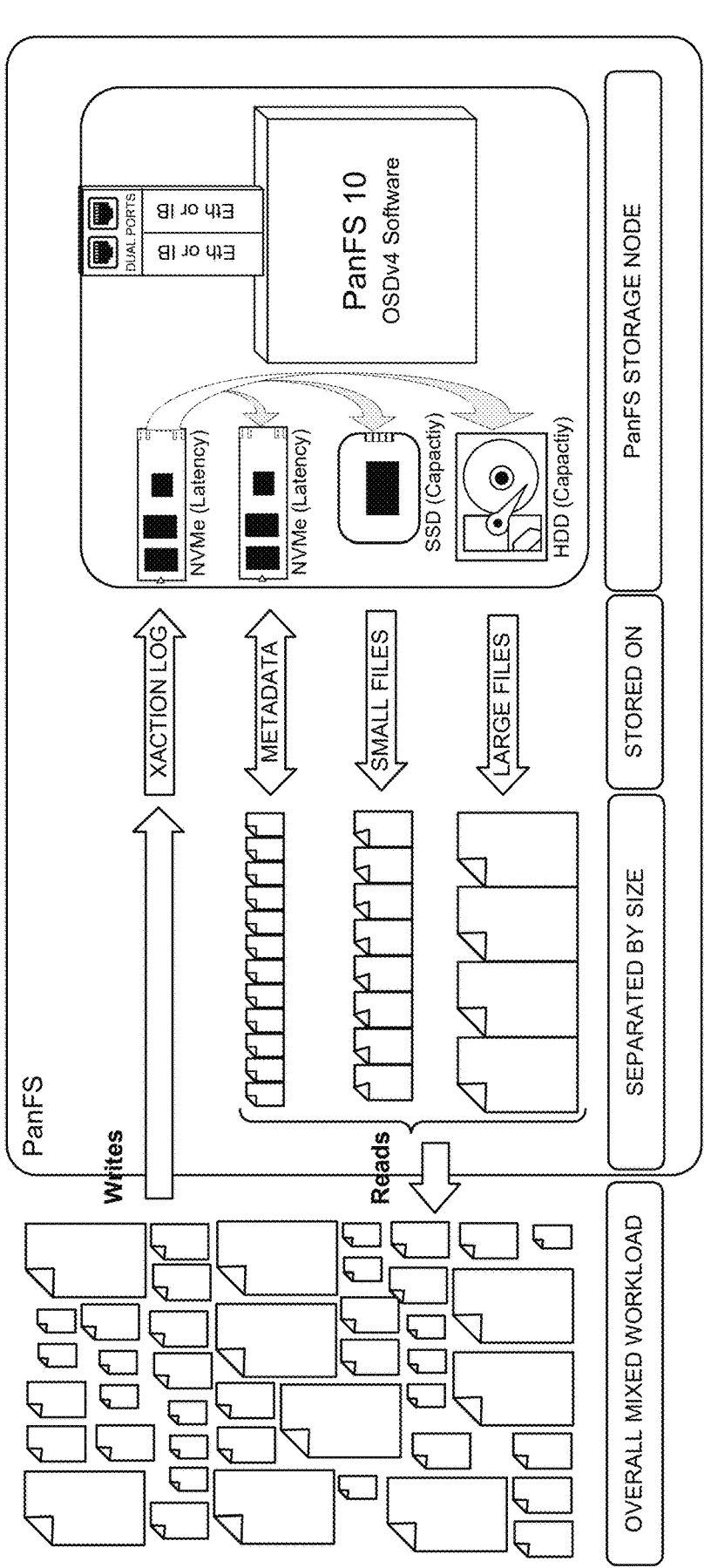
FIG. 3 illustrates the operation of storage nodes of the storage system, in accordance with one or more embodiments.

FIG. 3 illustrates the operation of storage nodes of the storage system, according to an embodiment. The storage system architecture provides performance and reliability advantages as well as significant performance optimizations using the storage node software to enable efficient use of the available storage media inside each storage node. The storage system storage node handles multiple performance tiers of storage. According to an embodiment, the different performance tiers of a storage node include storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The storage system takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The storage system tries to keep each SSD full above a threshold level, for example, above 80% full. If an SSD falls below that threshold level, the storage system selects the smallest component objects from the next slowest set of drives and moves them to the SSD until it is about 80% full. If the SSD is too full, storage system moves the largest component objects on the SSD to the next slower tier of drives. Every storage node performs this optimization independently and continuously. A storage node selects component objects to move by looking in its local metadata database.

Storage nodes in the storage system are object storage devices (OSDs). An object stored in an OSD is a Small Computer System Interface (SCSI) object. The storage system can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the storage system supports multiple blade sets in a realm and in the same namespace at the same time.

Figure 4:
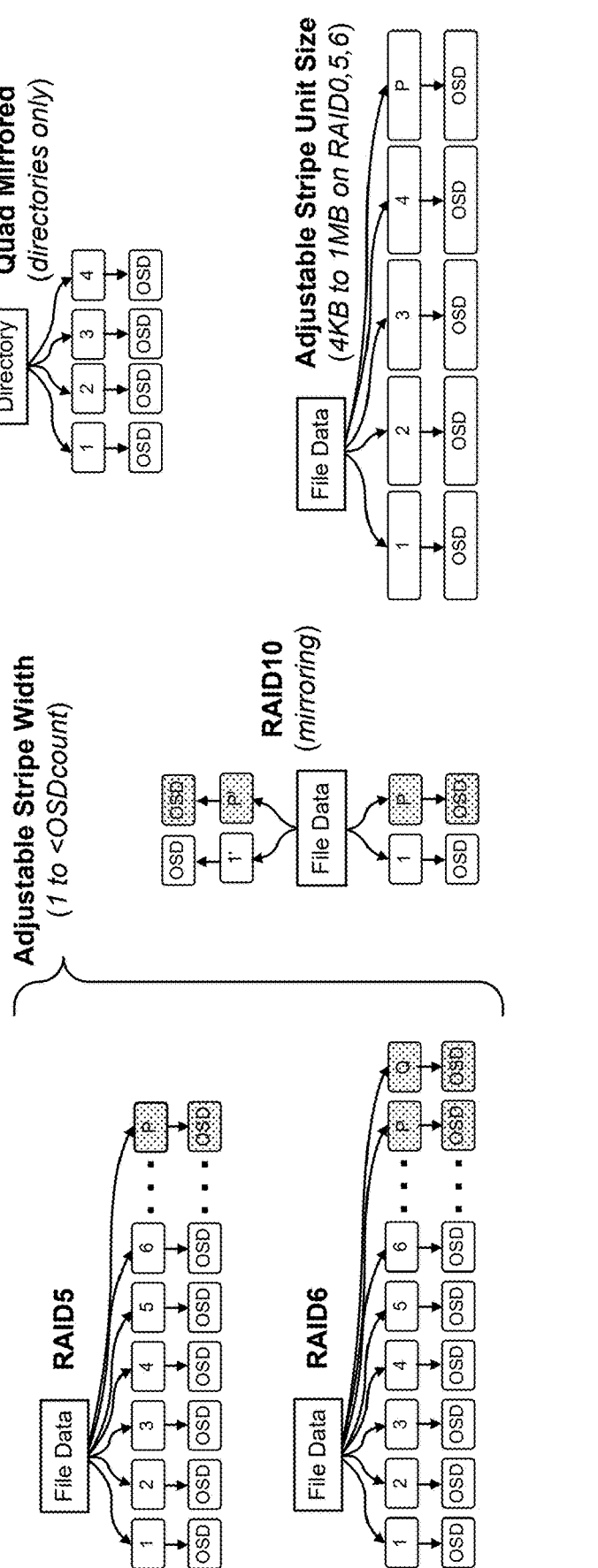
FIG. 4 illustrates the details of layout of a file stored in the storage system, in accordance with one or more embodiment.

FIG. 4 shows the details of layout of a file stored in the storage system, according to an embodiment. The storage system stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The storage system stores large POSIX files using erasure coding across multiple component objects, and store small POSIX files using triple-replication across three component objects. This approach delivers higher performance and makes it more space efficient. Unless the first write to a file is a large one, the storage system starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a storage system storage node fails, the storage system reconstructs only those component objects that were on the failed storage node. This is distinct from a RAID array that would reconstruct the entire raw capacity of the storage node. The storage system reads the component objects for each affected file from all the other storage nodes and uses each file's erasure code to reconstruct the component objects that were on the failed node.

When a BladeSet in the storage system is first set up, the storage system sets aside a configurable amount of spare space on all the storage nodes in that BladeSet to hold the output from file reconstructions. When the storage system reconstructs a missing component object, it writes it to the spare space on a randomly chosen storage node in the same BladeSet. As a result, during a reconstruction the storage system uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the storage system protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the storage system maintains a complete directory tree, it can identify the full pathnames of precisely which files need to be restored from a backup or reacquired from their original source, and can therefore also recognize which files were either unaffected or recovered using their erasure coding.

Example Architecture of Director Node

Figure 5:
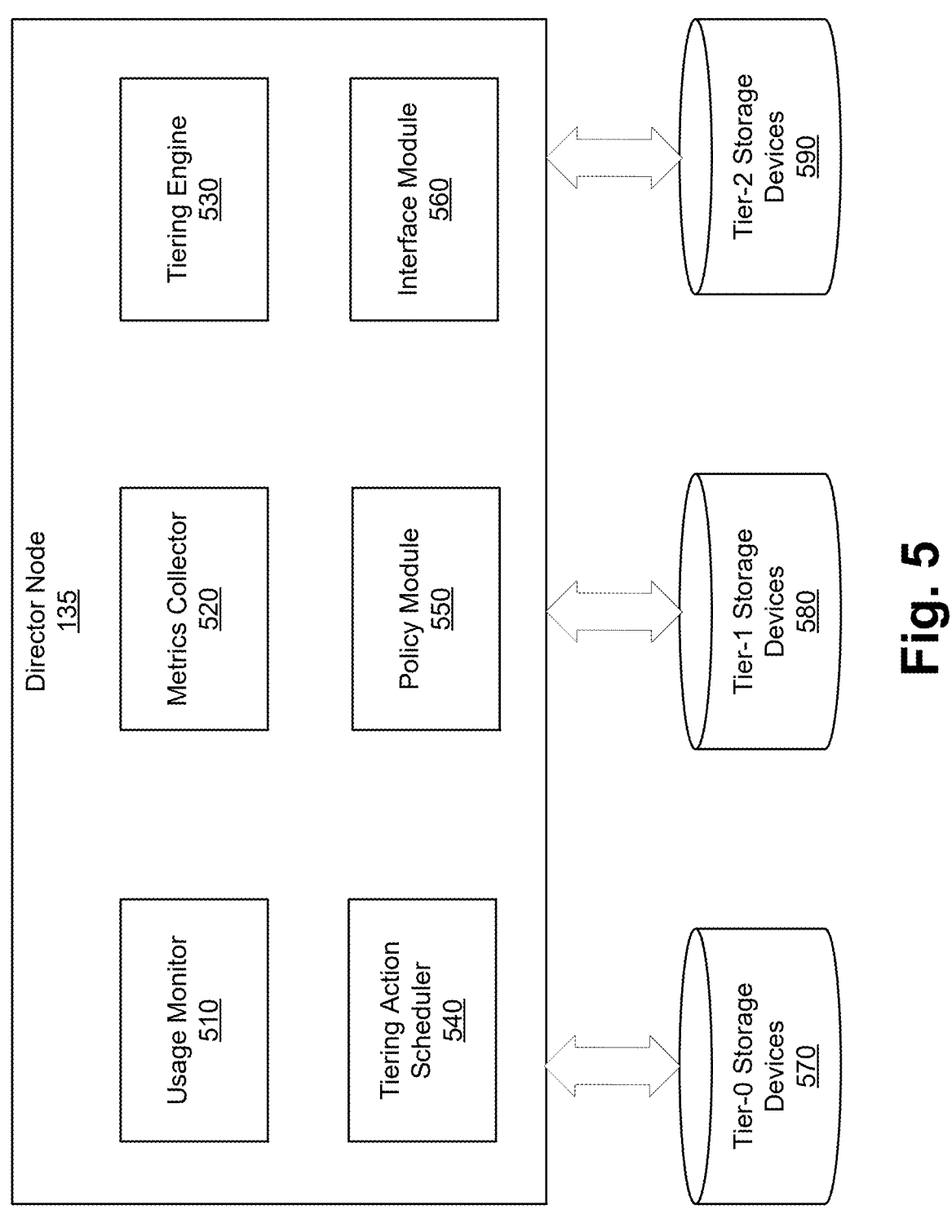
FIG. 5 illustrates an example architecture of a director node configured to perform data tiering operations in a multi-tier storage system, in accordance with one or more embodiments.

FIG. 5 illustrates an example architecture of a director node 135 configured to perform data tiering operations in a multi-tier storage system. The direction node 135 includes a usage monitor 510, a metrics collector 520, a tiering engine 530, a tiering action scheduler 540, a policy module 550, and an interface module 560. The director node 135 interfaces with multiple types of storage devices: Tier-0 storage devices 570 (e.g., high-performance media), Tier-1 Storage Devices 580 (e.g., general-purpose SSDs), and Tier-2 Storage Devices 590 (e.g., lower-cost HDDs or archival storage). It should be understood that the modular architecture illustrated in FIG. 5 is exemplary and not limiting. In various embodiments, the number and arrangement of modules may differ from what is shown. Additional modules may be included to provide enhanced functionality, or certain modules may be omitted in simplified implementations. Furthermore, in some embodiments, the functionality described herein as being performed by multiple distinct modules may be combined and implemented within a single integrated module. Conversely, the functionality attributed to a single module may, in alternative embodiments, be partitioned and distributed across two or more separate modules. Such variations are within the scope of the present disclosure.

Usage monitor 510 is configured to track data access events across the storage system in real time. In some embodiments, the usage monitor 510 is configured to monitor operations such as file reads, writes, and metadata updates, and records temporal aspects of access such as recency, frequency, and burst patterns. For read operations, the usage monitor 510 may log the timestamp of access, the byte range read, the size of the read request, and whether the access pattern was sequential or random. For write operations, the usage monitor 510 may capture the size of the write, write frequency over a defined interval, and the spatial locality of writes relative to prior access patterns. For metadata updates, the usage monitor 510 may track operations such as file creation, renaming, permission changes, and attribute modifications (e.g., changes to file size or last-modified time). In some embodiments, the usage monitor 510 is further configured to identify bursty access patterns—such as a file being read repeatedly within a short window—and annotate such events as high-temporal-density regions. The module may also track idle intervals for each file, enabling identification of cold data. In some embodiments, the usage monitor 510 acts as a first layer of observation, generating raw usage signals that are subsequently processed by downstream components such as the metrics collector or tiering engine. These raw signals form the foundational telemetry used to assess workload characteristics and support dynamic, informed data placement decisions.

Tiering Engine 530 is configured to execute a plurality of data tiering algorithms in parallel, with each algorithm operating over a selected subset of usage and performance metrics received from the metrics collector 520. These algorithms may be heterogeneous in design, encompassing rule-based heuristics, statistical models, or machine learning models, and may focus on different dimensions of file behavior such as temporal access patterns, workload burstiness, data locality, or read/write balance. Each algorithm independently evaluates the current placement of a given data item and produces a numeric recommendation—e.g., a score within a bounded range such as [−1, 1]—that reflects whether the data item should be promoted to a higher-performance tier, demoted to a lower-performance tier, or retained at its current tier. For example, a score near +1 may indicate a strong preference for promotion, whereas a score near −1 may signal the need for demotion.

A data item refers to any unit of data stored within the storage system that may be subject to tiering evaluation and movement across different performance tiers. In various embodiments, a data item may correspond to a file, directory, object, database record, virtual machine image, block device segment, or any other addressable data structure. The granularity of the data item may vary depending on the configuration of the storage system and the nature of the workload. For example, in a file-based storage environment, each file may be treated as a separate data item, while in an object storage system, each uniquely identifiable object may serve as the data item. In block-based storage systems, data items may correspond to fixed-size or variable-size blocks, extents, or logical volumes. The system may maintain metadata for each data item, such as access frequency, recency, size, and location, which are used by the tiering algorithms to evaluate suitability for promotion, demotion, or retention within a particular storage tier.

The tiering algorithms may include (but are not limited to) an access frequency-based algorithm, a recency-decay algorithm, a sequentially heuristic algorithm, a file growth rate monitor, a burstiness detection algorithm, a latency sensitivity classifier, a temporal pattern recognizer, an access locality algorithm, a read-write ratio analyzer, a cost-aware tiering algorithm, among others.

The access frequency-based algorithm monitors how often a data item is read or written over a defined time interval. This algorithm calculates a frequency score by aggregating access events, optionally normalized by file size or time. Files that exceed a configurable threshold are considered "hot" and candidates for promotion to higher-performance tiers, while files with low access frequency are flagged for demotion. This algorithm is effective in identifying consistently active data and ensuring such files are readily available on faster storage media.

The recency-decay algorithm assigns a score to each data item based on the time elapsed since its last access. The score decays exponentially over time, meaning more recently accessed files receive higher scores than files that have not been touched in a while. This temporal perspective enables the system to demote stale data gradually, freeing up high-performance storage for more current or active files. It is especially useful in workloads with strong temporal locality.

Sequentiality refers to a measure of the continuity of data access patterns over time. Sequentiality characterizes whether consecutive read or write operations target adjacent or contiguous regions of a data item. In some embodiments, a high sequentiality score is indicative of data accesses that proceed in an ordered fashion—for example, reading or writing consecutive blocks of a file. Conversely, low sequentiality (or high randomness) is observed when data accesses occur at widely separated or non-contiguous offsets. Sequentiality may be computed by analyzing the deltas between successive byte-range offsets within a time window, and calculating a ratio of sequential accesses to total accesses. High sequentiality is generally associated with workloads that are well-suited to lower-cost, high-throughput storage media such as hard disk drives (HDDs), whereas low sequentiality is associated with workloads that may benefit from low-latency storage tiers such as solid-state drives (SSDs).

The sequentiality heuristic algorithm evaluates whether data access patterns for a file are primarily sequential or random. As described above, sequential access patterns are typically more tolerant of slower storage devices like HDDs, while random access patterns benefit from SSDs with low latency. The algorithm examines access offsets and ranges to determine access mode and suggests tiering actions accordingly. This helps optimize tier assignment based on workload characteristics.

The file growth rate monitor tracks how quickly a file increases in size over time. Rapidly growing files may signal active data generation or temporary logs, which benefit from higher-tier storage for performance. Conversely, files with stable or shrinking sizes may be better candidates for demotion. This algorithm is particularly useful in environments involving backup, logging, or media ingestion workflows.

Burstiness refers to the degree of variability or concentration of data access events over time. A data item is considered bursty if it exhibits short intervals of high access intensity followed by long periods of little or no activity. Burstiness may be quantified by measuring the variance or peak-to-average ratio of access frequency within a defined time window. In some embodiments, burstiness is detected by computing the standard deviation or coefficient of variation of access events across consecutive time intervals. Burstiness is relevant in tiering decisions because short-lived spikes in access demand may justify temporary promotion of a data item to a faster storage tier, whereas sustained inactivity may favor demotion. Accurately identifying bursty behavior allows the system to opportunistically optimize tier placement to meet transient performance needs while minimizing long-term storage costs.

The burstiness detection algorithm identifies files exhibiting irregular but intense access patterns—bursts of activity followed by dormancy. It uses variance and peak analysis within a sliding time window to measure volatility in access frequency. When burstiness is detected, the algorithm may recommend short-term promotion followed by re-evaluation, ensuring files are promoted just-in-time for workload peaks and returned to lower tiers after use.

The latency sensitivity classifier assesses whether a data item is involved in latency-critical operations. This can be inferred by correlating access patterns with system-level response time objectives or by identifying access by known latency-sensitive applications. Files that consistently contribute to high I/O wait times are marked as latency sensitive and prioritized for storage on high-performance tiers such as NVMe SSDs or persistent memory.

The temporal pattern recognizer analyzes cyclical or scheduled usage patterns—e.g., daily backups, nightly analytics, or weekly reports. Using time-series analysis and pattern-matching techniques, it identifies recurring access windows and can proactively promote files ahead of expected usage spikes. This algorithm enables anticipatory tiering to align with predictable workload cycles.

The access locality algorithm examines spatial relationships among files or data blocks. Files often accessed in conjunction with other files—such as those in the same directory or project—are grouped into locality clusters. If a cluster shows heavy access activity, all related files may be promoted together to improve overall performance. This algorithm leverages the fact that user behavior often involves contextually related data.

The read-write ratio analyzer evaluates the balance between read and write operations on a file. Some storage tiers may be optimized for read-heavy workloads (e.g., QLC flash), while others are better suited for write-heavy data. By computing the read-to-write ratio over time, this algorithm helps assign data to storage tiers best aligned with their access characteristics, improving both performance and media endurance.

The cost-aware tiering algorithm incorporates storage cost metrics into its evaluation, considering the economic impact of keeping data on various storage tiers. It may compute a utility score for each data item as a function of its access profile divided by the cost of the storage tier it currently occupies. Data with low utility on expensive tiers are demoted, while high-utility items may justify promotion. This algorithm helps align technical decisions with financial optimization objectives.

Each tiering algorithm, regardless of its internal logic or scale, outputs a raw value—such as access count, latency in milliseconds, recency in seconds, or a probability of a binary output. In some embodiments, the tiering engine 530 is configured to transform the output of each tiering algorithm into a normalized score within a common bounded range, such as −1,1, to enable consistent aggregation and consensus evaluation across multiple heterogeneous algorithms.

In some embodiments, the output of each algorithm, which may be based on distinct metrics and may vary in scale, distribution, or data type, is first subjected to a normalization process. In one embodiment, the system applies a min-max normalization technique, wherein a raw output value is scaled relative to a predefined or dynamically computed minimum and maximum range associated with that algorithm's expected output. For example, a raw access frequency value may be normalized using Equation (1) below:

$$\text{Normalized\_value} = (X - X\text{ min})/(X\text{ max} - X\text{ min}),\qquad \text{Equation (1)},$$

where X represents the raw value, and Xmin and Xmax are the minimum and maximum bounds, respectively.

Following normalization, the system maps the resulting value into the dsired scoring interval, such as −1, 1, to align all algorithm outputs with a unified semantic interpretation. In some embodiments, a linear transformation is applied, such as Equation (2) below:

$$\text{Score} = 2 \times \text{normalized\_value} - 1,\qquad \text{Equation (2)}$$

Such that a normalized value of 0.0 corresponds to a score of −1.0 (strong recommendation to demote), a normalized value of 0.5 corresponds to 0 (neutral or retain), and a normalized value of 1.0 corresponds to +1.0 (strong recommendation to promote). In some embodiments, nonlinear mapping functions such as sigmoid or hyperbolic tangent (tanh) functions may be applied to normalized or standardized values (e.g., z-scores) to provide smoother transitions and mitigate the effect of outliers or heavy-tailed distributions.

The transformation logic may further include semantic alignment steps to ensure that all algorithm outputs conform to a common directional interpretation. For example, a higher access frequency, more recent usage, or lower latency may be mapped toward +1, while older, infrequently accessed, or slower-performing data items may be mapped toward −1. In some embodiments, the system may apply clamping or bounding operations to restrict final scores to the target interval, and may optionally apply algorithm-specific weights or confidence scores prior to aggregation. This normalization and mapping framework enables consistent and unbiased integration of diverse tiering logic into the ensemble-based consensus framework described herein.

In some embodiments, the tiering engine 530 is configured to compute a consensus metric for each data item by aggregating the normalized output scores generated by a plurality of tiering algorithms. Each tiering algorithm produces a scalar recommendation score, e.g., within a bounded interval such as −1,1, that reflects whether a given data item should be promoted to a higher-performance tier, demoted to a lower-performance tier, or retained in its current tier. The aggregation of these individual scores is performed to produce a single consensus score that reflects the collective recommendation of the ensemble.

In some embodiments, the system aggregates the individual scores by computing an arithmetic mean across the outputs of all participating tiering algorithms. For a given data item, if s1, s2, . . . , sn, represent the normalized scores output by n tiering algorithms, the consensus metric S may be computed based on Equation (3) below:

$$S = \frac{1}{n}\sum_{i=1}^{n} s_i, \qquad \text{Equation (3)}$$

This consensus score maintains the same bounded range as the individual algorithm scores and reflects the average tendency of the ensemble, with positive values indicating a collective inclination toward promotion, negative values indicating demotion, and near-zero values suggesting retention.

In some embodiments, the aggregation may be performed using a weighted average, wherein each algorithm is assigned a weight based on factors such as historical performance, confidence level, or relevance to the current workload. In such embodiments, the consensus score is computed based on Equation (4) below:

$$S = \frac{\sum_{i=1}^{n} w_i \cdot s_i}{\sum_{i=1}^{n} w_i}, \qquad \text{Equation (4)}$$

where $w_i$ denotes the weight assigned to the i-th algorithm. The use of weighted aggregation allows the system to preferentially emphasize the output of algorithms that have demonstrated higher predictive utility or alignment with recent performance outcomes.

In some embodiments, the system is configured to dynamically assign a weight $w_i$ to each tiering algorithm based on one or more factors indicative of that algorithm's relevance, accuracy, or effectiveness in recent tiering decisions. In one embodiment, the weight $w_i$ is computed based on a performance score that reflects how well the recommendations produced by the i-th algorithm have correlated with post-tiering improvements in system performance metrics, such as reduced access latency, increased throughput, or improved cache hit rates. For example, if a recommendation by an algorithm to promote a file results in a measurable performance benefit, the corresponding algorithm's weight may be incrementally increased. Conversely, if an algorithm's past recommendations consistently lead to neutral or adverse effects, its weight may be decreased.

In some embodiments, the performance score may be computed over a sliding time window to reflect recent behavior, and may incorporate smoothing functions to avoid overreacting to transient fluctuations. Additional factors influencing weight assignment may include the algorithm's historical stability, its domain of applicability (e.g., read-heavy vs. write-heavy workloads), or administrator-defined preferences. Weights may be normalized across the ensemble to ensure their sum remains constant, thereby maintaining consistency in the weighted aggregation process. This dynamic weighting mechanism allows the system to adaptively emphasize the most effective tiering strategies under evolving workload conditions.

In some embodiments, the tiering engine 530 may optionally apply post-aggregation processing to the consensus metric. This may include thresholding the score to produce a discrete classification (e.g., promote, demote, retain), smoothing or averaging over a time window to avoid oscillatory tiering behavior, or combining the consensus metric with policy-driven constraints to influence final decision thresholds. The consensus metric thus serves as the unified, ensemble-based signal upon which tiering actions are conditionally triggered.

Metrics collector 520 is configured to collect performance metrics associated with data items and underlying storage devices. For data items, performance metrics may include average read and write latency, IOPS (input/output operations per second), bandwidth utilization, cache hit rates, and observed access delays under load. These metrics help quantify how well a data item is being served by its current storage tier and may be used to determine whether tiering actions result in improved performance. For storage devices, the metrics collector 520 may gather device-level statistics such as queue depth, throughput saturation, thermal state, media wear levels, and error rates. By correlating file-level access behavior with device-level health and utilization, the system can make more informed tiering decisions that account not only for workload characteristics but also for storage tier conditions and longevity. These performance metrics may be periodically sampled or event-triggered and stored in time-series form for historical analysis or real-time feedback. In some embodiments, the metrics collector 520 may also calculate performance deltas before and after tiering actions to evaluate the effectiveness of specific tiering algorithms, enabling adaptive reweighting or algorithm pruning in the ensemble strategy implemented by the tiering engine 530.

Tiering action scheduler 540 is configured to determine the timing and execution order of data migration actions based on consensus outputs received from the tiering engine 530. In some embodiments, the tiering action scheduler 540 may evaluate factors such as system load, I/O activity, and migration cost to decide when and how to move data between tiers. Tiering action scheduler 540 may defer or throttle actions to avoid contention with active user workloads and to satisfy policy-defined thresholds. As such, asynchronous, non-disruptive enforcement of tiering decisions are enabled.

Policy module 550 is configured to enforce and manage a set of administrative or system-level policies that govern the behavior of the data tiering system. These policies may be predefined by system administrators or dynamically generated by optimization routines, and are intended to align tiering decisions with organizational goals, workload priorities, or service-level agreements (SLAs). In some embodiments, the policies managed by the policy module 550 specify threshold values for interpreting consensus scores output by the tiering engine 530. For example, a policy may define that a consensus score above +0.6 is required to trigger promotion of a data item, while a score below –0.6 results in demotion, and scores in between result in no action.

In addition to threshold management, the policy module 550 may also define limits on migration frequency to prevent excessive churn or unnecessary data movement. For instance, a policy may restrict any given data item from being moved more than once within a specified time window, or may cap the total volume of promoted or demoted data per evaluation cycle to avoid overloading system resources. Policies may further include performance objectives—such as minimum cache hit ratios, maximum average latency, or utilization targets for specific storage tiers—that influence how tiering recommendations are interpreted or prioritized.

In some embodiments, the policy module 550 is configured to dynamically adjust tiering parameters in response to real-time system observations or workload changes. This may include adjusting the evaluation frequency of certain tiering algorithms, modifying the weights $w_i$ applied during consensus score aggregation, or temporarily overriding thresholds under high load or failure conditions. For example, if a storage tier is nearing capacity, the policy module 550 may increase the demotion threshold to reduce data ingress, or shift algorithm weights to favor conservative placement strategies.

The policy module 550 may also support multi-tenant environments, where different clients or applications are subject to distinct policies based on their performance class, billing tier, or access rights. In such cases, the module ensures that tiering decisions respect isolation boundaries and policy scopes. The contextual adaptability provided by the policy module 550 ensures that the data tiering system remains responsive, efficient, and aligned with high-level operational goals across diverse and evolving usage scenarios.

Interface module 560 is configured to manage external interactions with the director node 135 and to provide visibility and control over the tiering operations performed by the system. In some embodiments, the interface module 560 exposes one or more application programming interfaces (APIs) that enable programmatic access to system functions such as reading current tiering status, retrieving usage and performance metrics, submitting configuration changes, or injecting tiering overrides. These APIs may be consumed by system administrators, orchestration tools, or client systems seeking to integrate tiering logic with broader data management workflows.

In addition to APIs, the interface module 560 may expose command-line tools (CLI utilities) and graphical user interfaces (GUIs) to facilitate interactive management of the tiering system. These interfaces allow administrators to define and update policy parameters, adjust algorithm weights, monitor algorithm-specific outputs and consensus scores, and manually trigger or suppress tiering actions. In some embodiments, real-time visual dashboards may be provided to display historical trends, storage tier utilization, and active data migrations, helping operators understand the behavior and impact of tiering decisions over time.

In some embodiments, the interface module 560 is further configured to enable detailed logging of tiering decisions and system telemetry. For each tiering evaluation cycle, the interface module 560 may log the input metrics, algorithmic outputs, consensus scores, applied policies, and final tiering actions taken. This information may be stored in a structured format suitable for audit trails, compliance verification, performance debugging, or root-cause analysis. In some embodiments, the telemetry may be exported to external monitoring platforms or SIEM (Security Information and Event Management) systems via standardized protocols.

By providing comprehensive access, configuration, and observability mechanisms, the interface module 560 ensures that the tiering framework remains transparent, traceable, and controllable. This facilitates trust in automated decision-making while preserving the flexibility for manual intervention or policy tuning as operational conditions evolve. In multi-tenant environments, the interface module 560 may also enforce access controls or present tenant-specific views to isolate visibility and management capabilities.

Example "Wisdom of the Crowd" Ensemble Model

Figure 6:
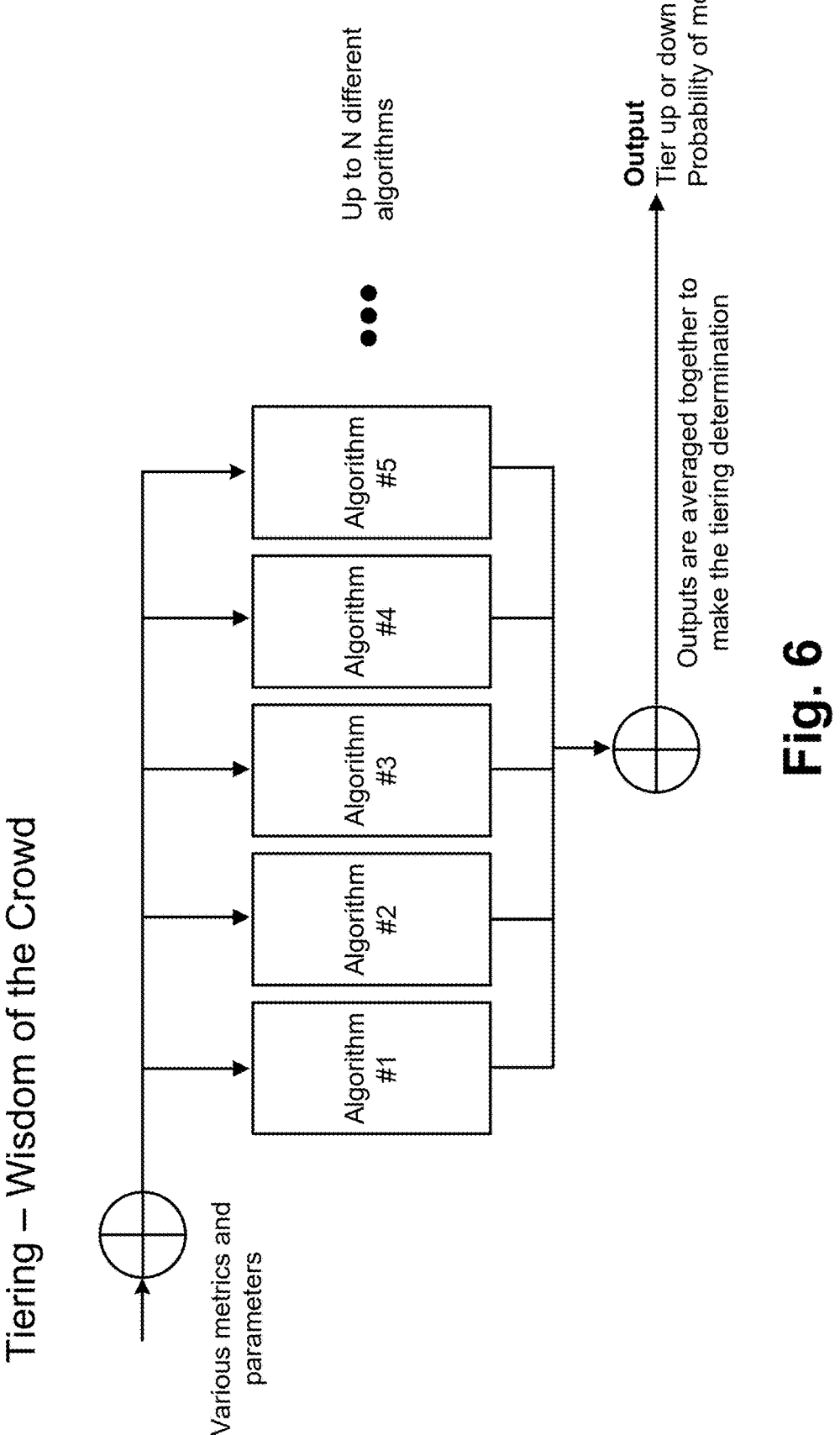
FIG. 6 illustrates an example tiering decision framework based on a "wisdom of the crowd" ensemble model, in accordance with one or more embodiments.

FIG. 6 illustrates an example tiering decision framework based on a "wisdom of the crowd" ensemble model, in accordance with one or more embodiments. As shown, a set of various metrics and parameters are collected from the storage system, including but not limited to access frequency, recency, file size, file growth rate, sequentiality, and burstiness. These metrics serve as input features to a plurality of distinct tiering algorithms, labeled in FIG. 6 as Algorithm #1 through Algorithm #5, though any number N of algorithms may be implemented. Each algorithm may process a different subset of the metrics and may be based on a unique heuristic, rule set, or analytical model. The outputs of these algorithms are individual tiering recommendations, expressed as normalized scores within a bounded range. These scores are then aggregated—e.g., through averaging or weighted summation—to produce a consensus score that reflects the collective recommendation of the ensemble. As indicated in the lower right portion of FIG. 6, the final output includes a tiering determination, such as a recommendation to promote or demote a data item between storage tiers, as well as an associated confidence value or probability of move. This architecture enables robust and adaptive tiering decisions by leveraging the diversity of multiple analytic perspectives.

Figure 7:
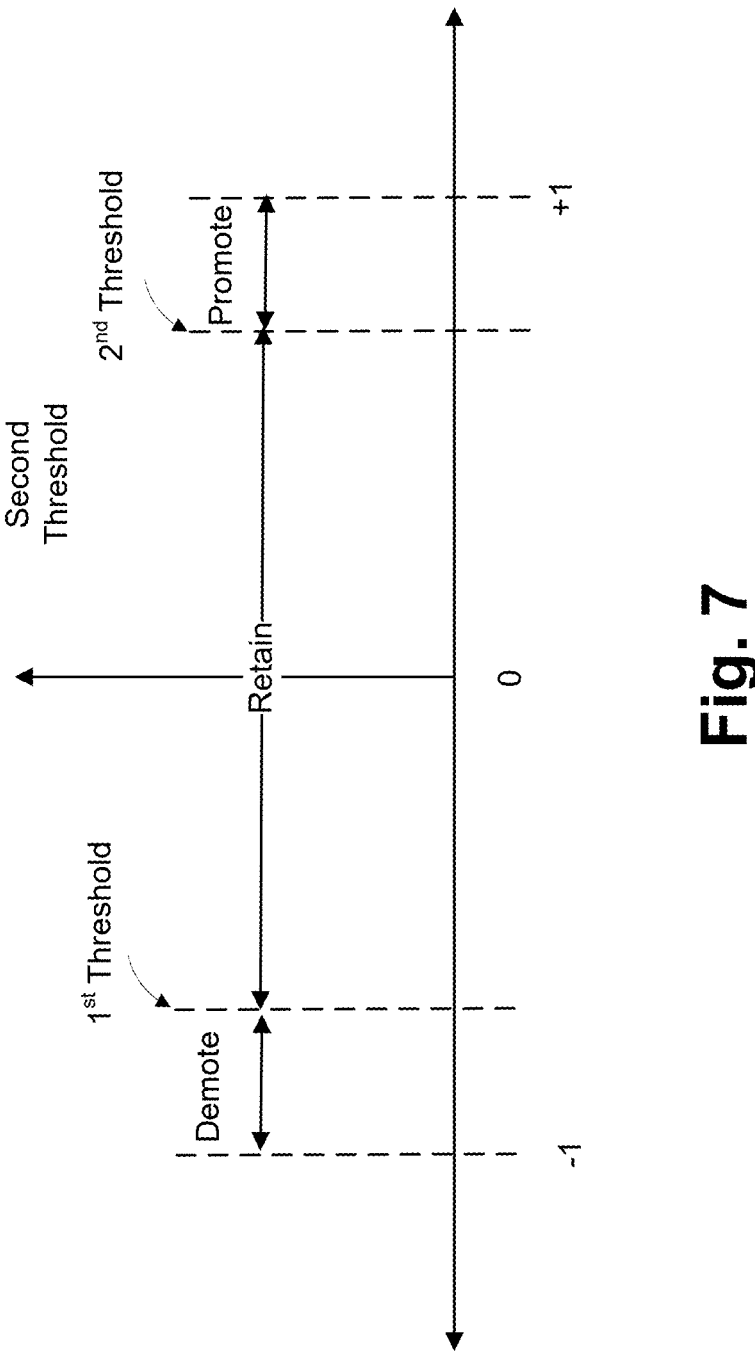
FIG. 7 illustrates an example scoring model for interpreting the consensus output of a plurality of tiering algorithms to determine whether a data item should be promoted, demoted, or retained within its current storage tier, in accordance with one or more embodiments.

FIG. 7 illustrates an example scoring model for interpreting the consensus output of a plurality of tiering algorithms to determine whether a data item should be promoted, demoted, or retained within its current storage tier, in accordance with one or more embodiments. The horizontal axis represents a normalized score range extending from −1 to +1, where each point along the axis corresponds to an aggregated consensus score derived from the outputs of multiple tiering algorithms. A score of zero indicates a neutral position with no strong recommendation for movement. The system defines two threshold boundaries: a first threshold less than zero and a second threshold greater than zero. If the consensus score falls below the first threshold, the system interprets this as a recommendation to demote the data item to a lower-performance storage tier. If the consensus score falls above the second threshold, the system interprets this as a recommendation to promote the data item to a higher-performance tier. Scores falling between the first and second thresholds are interpreted as a recommendation to retain the data item in its current tier. In some embodiments, the first and second thresholds may be symmetric or independently defined, and may be dynamically adjusted by the policy module 550 based on system conditions, performance goals, or migration constraints. This threshold-based interpretation mechanism ensures that tiering actions are taken only when a sufficiently strong and consistent consensus exists among the underlying tiering algorithms.

Methods for Managing Data Placement in a Multi-Tier Storage System

FIGS. 8-9 are flowcharts of example methods 800 or 900 for managing data placement in a multi-tier storage system, in accordance with one or more embodiments. The steps in the method 800 may be performed in any sequence. In some embodiments, more or fewer steps may be included in the method 800 or 900. The method 800 or 900 may be performed by a computing system, e.g., a director node 135, described herein with respect to FIGS. 1-7. It should be understood that, in various embodiments, the method illustrated in FIG. 8 or 9 may include additional steps not explicitly shown, or may omit one or more steps depicted therein. Furthermore, the steps described with respect to FIG. 8 or 9 are not intended to be limited to the precise sequence illustrated, and unless explicitly stated otherwise, need not be performed in any particular order. Steps may be performed in parallel, out of sequence, or in an event-driven or condition-dependent manner, consistent with the functional requirements of the system.

The system monitors 810 usage of a plurality of data items stored across a plurality of storage devices. Each storage device is associated with a performance tier. These performance tiers may represent varying levels of latency, throughput, and cost—such as NVMe SSDs for Tier-0, general-purpose SSDs for Tier-1, and HDDs or cold storage media for Tier-2 or Tier-3. The monitoring process may include observing real-time data interactions, such as how frequently and recently each data item is accessed, which applications or processes access the data, and whether these interactions follow consistent patterns or are sporadic. This step enables the system to form a dynamic view of workload activity across the storage environment. The monitoring may be continuous or event-triggered, and may also track changes in storage capacity utilization, device health indicators, or system load.

The system collects 820 usage metrics for the plurality of data items. The usage metrics includes one or more of access frequency, access recency, file size, file growth rate, sequentiality, or temporal access pattern. Access frequency refers to how often a data item is read or written over a defined interval, while access recency indicates how long it has been since the item was last accessed. File size may influence the suitability of a storage tier based on space efficiency or transfer time, and file growth rate may reflect ongoing modification activity. Sequentiality measures whether the data is accessed in a contiguous block-wise manner, which is more efficient on some storage media, whereas temporal access patterns describe time-based usage regularities, such as daily spikes or idle weekends. The system may collect these metrics through kernel-level hooks, file system telemetry, or via instrumentation embedded in the storage nodes.

This comprehensive profiling enables the system to construct a multi-dimensional behavioral model for each data item.

The system performs 830 a plurality of tiering methods—also referred to as tiering algorithms—on the set of data items. These methods may operate independently and in parallel, although not necessarily at the same time or frequency. Each tiering method may be tailored to evaluate different facets of data behavior; for instance, one algorithm may prioritize access frequency while another focuses on burstiness or latency sensitivity. Some tiering methods may use heuristics, whereas others may employ statistical models, rule-based decision trees, or machine learning classifiers. Each method processes a subset of the collected metrics and generates a numeric score or categorical recommendation for each data item. The recommendation may fall into one of three categories: (i) promote the data item to a higher-performance tier due to active or latency-sensitive usage; (ii) demote the data item to a lower-performance tier due to inactivity or archival nature; or (iii) retain the data item in its current tier when no compelling evidence for movement exists.

The system aggregates 840 the tiering recommendations from the plurality of tiering methods to generate a consensus decision for each of the plurality of data items. This aggregation is to reconcile potentially divergent views among the algorithms. In some embodiments, the system computes a simple average of the normalized recommendation scores, each falling within a predefined bounded range (e.g., −1, 1). In other embodiments, a weighted average is used, wherein each algorithm's output is scaled by a weight reflecting its past performance, reliability, or relevance to the current workload. Thresholds are applied to the resulting consensus score to classify the outcome into promote, demote, or retain categories. The aggregation mechanism enhances robustness and reduces reliance on any single algorithm that may underperform in certain conditions. By capturing the collective "wisdom" of diverse analytical strategies, the system is better equipped to generalize across varying workloads, usage patterns, and storage configurations.

In response to the consensus decision derived from the aggregation step, the system performs 850 a data tiering action to adjust the storage location of the affected data item. If the consensus indicates that the data item should be promoted, the system initiates relocation of that item to a higher-performance storage tier—such as migrating it from an HDD to an SSD or from a general-purpose SSD to a low-latency NVMe drive. Conversely, if the decision calls for demotion, the data item is moved to a lower-performance, cost-effective tier, such as nearline or cold storage. These data movements may be executed asynchronously to avoid impacting active workloads, and the system may schedule migrations based on priority, bandwidth availability, or predefined rate limits. The relocation process may include updating metadata, re-striping data across nodes, and ensuring consistency checks. Tiering actions may also be logged for auditing and used to further refine the effectiveness of the underlying tiering algorithms in subsequent evaluations.

FIG. 9 is a flowchart of another example method 900 for managing data placement in a multi-tier storage system, in accordance with one or more embodiments. As illustrated in FIG. 9, the system collects 910 performance metrics associated with data items before and after data tiering actions. These metrics are used to evaluate the effectiveness of the tiering decisions and to support a feedback loop that improves future recommendations. In some embodiments, the collected performance metrics include, but are not limited to, read and write latency, throughput (e.g., MB/s), IOPS, cache hit ratio, device-level utilization, and end-to-end response time for client operations involving the data item. Metrics may be collected at the granularity of individual files, blocks, or application-level transactions and may be time-stamped for chronological analysis. By comparing pre- and post-tiering performance metrics, the system is able to assess whether the data item's relocation to a new tier has yielded the intended benefit—such as reduced latency or improved access speed. These comparisons are logged and maintained in historical records, which form the basis for quantitatively scoring the performance of each tiering algorithm.

The system determines 920 a performance score of each of the plurality of tiering methods based on the collected performance metrics. In some embodiments, the system evaluates whether the action taken based on each algorithm's output led to measurable improvements in the performance of the corresponding data item. For example, if an algorithm recommended promoting a data item to a higher-performance tier and that promotion led to a significant reduction in average read latency or an increase in IOPS, a positive performance score is attributed to that algorithm. Conversely, if the action resulted in negligible or negative change, the score is adjusted downward. The system may compute these scores using statistical delta analysis, weighted rolling averages, or cumulative performance impact over time. These scores serve not only as historical records of algorithm efficacy but also as actionable indicators used in later stages of the process to calibrate algorithm influence during aggregation.

The system assigns 930 a weight to each of the plurality of tiering methods based on respective performance scores. These weights are used to modulate each algorithm's contribution to the final consensus decision. Algorithms that demonstrate consistent success—measured by their ability to drive beneficial outcomes—receive proportionally higher weights, thereby increasing their influence on the consensus output. In contrast, algorithms that have not historically led to performance gains may receive lower weights, diminishing their impact. The weight assignment process may be dynamic and adaptive, recalculated periodically or after each evaluation cycle. It may also take into account workload context, allowing the system to favor certain algorithms in read-heavy, write-intensive, or latency-sensitive environments. In some embodiments, the weights are normalized to ensure the sum of all weights equals one, preserving balance in the consensus calculation. This adaptive weighting framework enables the system to learn over time and improve decision quality in varied operating conditions.

The system performs 940 each of the plurality of tiering methods on a data item to output a metric value. Each algorithm processes a subset of the collected usage and performance metrics, such as access frequency, file size, or latency sensitivity, according to its specific logic or heuristic. The result of this processing is a numeric score, typically within a bounded range such as −1, 1, that conveys the direction and strength of the algorithm's recommendation. A value near +1 may indicate strong support for promotion, while a value near −1 may suggest demotion. A score close to 0 typically signals a recommendation to retain the data item in its current tier. Each tiering method operates independently, allowing the system to harness a diverse range of perspectives.

The system determines 950 consensus metric value by computing a weighted average of metric value output by the plurality of tiering methods. Each algorithm's output is multiplied by its assigned weight—determined based on prior performance—and then the products are summed and normalized. This yields a single consensus score, e.g., falling within the same bounded range (e.g., −1, 1), that captures the ensemble's collective judgment. The weighted average approach ensures that more reliable algorithms exert greater influence on the final decision while still allowing minority perspectives to contribute. This method helps avoid decision bias introduced by any single underperforming or overly aggressive algorithm. The consensus metric value may be recalculated periodically or on demand, depending on the update frequency of input metrics. This score forms the basis for the final tiering decision and may also be used in diagnostics, reporting, or to visualize decision certainty in system dashboards.

The system determines 960 a data tiering action based on the consensus metric value. This action may include classifying the consensus score according to predefined thresholds to decide whether the data item should be promoted, demoted, or retained. For example, if the consensus score exceeds an upper threshold (e.g., +0.6), the system promotes the data item to a higher-performance tier; if it falls below a lower threshold (e.g., −0.6), the system demotes it to a lower-performance tier. If the score lies between the thresholds, the item remains in its current tier. The thresholds themselves may be adjustable based on policy constraints, system resource availability, or workload characteristics. Once a decision is made, the system schedules the necessary data migration and updates metadata accordingly. In some embodiments, the relocation is performed asynchronously to avoid disruption to active I/O. The result of the tiering action may also be logged and used in future feedback cycles to refine algorithm performance evaluation.

Figure 10:
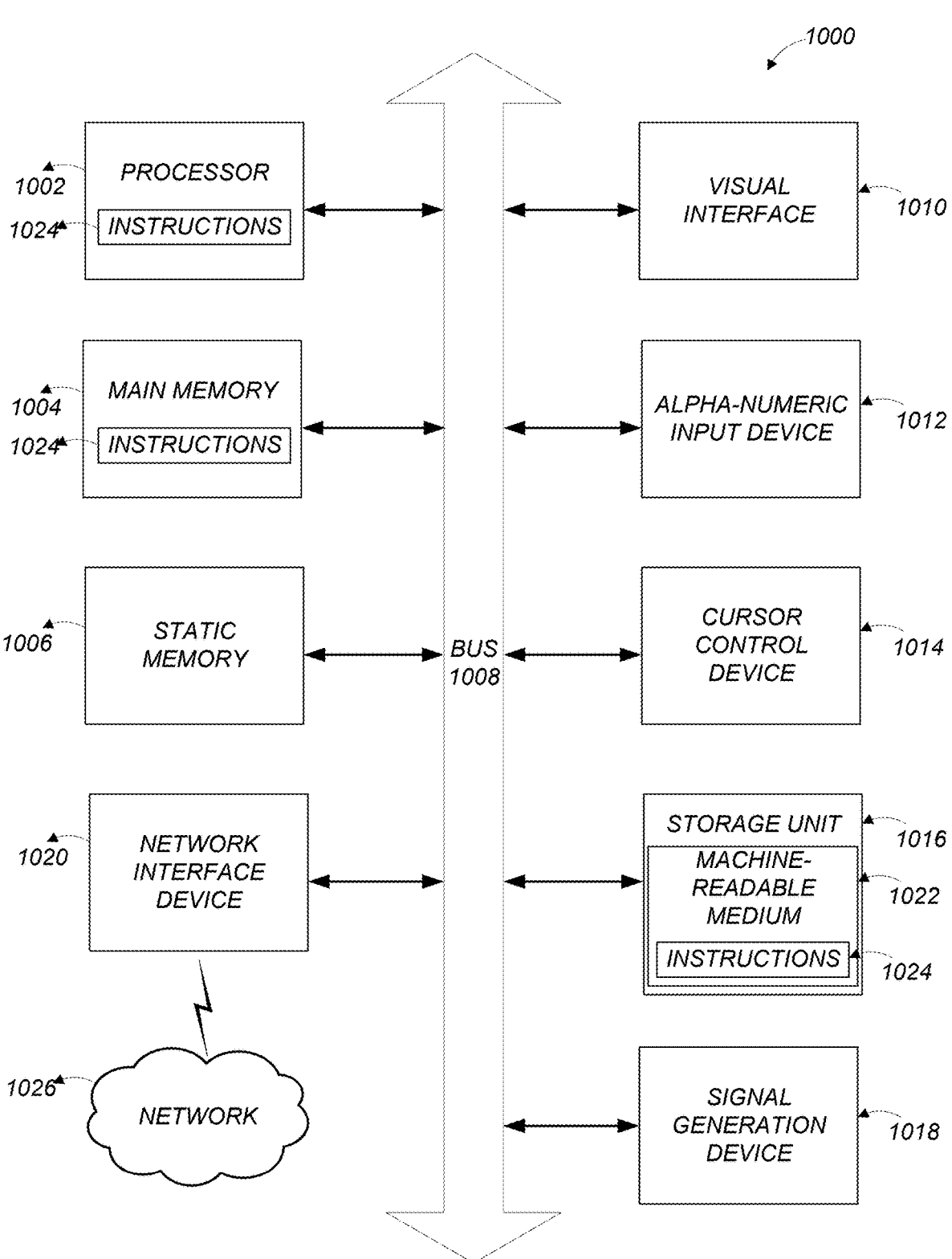
FIG. 10 is a block diagram illustrating components of an example machine able to read instructions from a machine-readable medium and execute them in a processor (or controller), in accordance with one or more embodiments.

In some embodiments, the method 900 illustrated in FIG. 9 is implemented as a recurring or cyclical process, allowing the system to dynamically improve its tiering decisions over time based on continuously monitored performance outcomes. After executing a data tiering action in step 960, the system resumes collection of updated performance metrics in step 910, capturing the effects of the most recent action on data item latency, throughput, or other indicators. These updated metrics are then used to re-evaluate the performance of each tiering method in step 920, resulting in revised performance scores. As a consequence, the weights assigned in step 930 are recalibrated to reflect current effectiveness, allowing the system to emphasize algorithms that continue to yield beneficial outcomes while deprioritizing those that do not. This iterative loop forms an adaptive feedback mechanism in which the tiering framework self-adjusts based on observed results, improving robustness, responsiveness, and overall storage system efficiency over time.
Example Computer System FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processors 1002 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 1004, and a static memory 1006, which are configured to communicate with each other via a bus 1008. The computer system 1000 may further include visual display interface 1010. The visual interface may include a software driver that enables (or provide) user interfaces to render on a screen either directly or indirectly. The visual interface 1010 may interface with a touch enabled screen. The computer system 1000 may also include input devices 1012 (e.g., a keyboard a mouse), a cursor control device 1014, a storage unit 1016, a signal generation device 1018 (e.g., a microphone and/or speaker), and a network interface device 1020, which also are configured to communicate via the bus 1008. The network interface device 1020 enables the system 1000 to communicate with other devices via a network 1026.

The storage unit 1016 includes a machine-readable medium 1022 (e.g., magnetic disk or solid-state memory) on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method for managing data placement in a multi-tier storage system, comprising:
monitoring usage of a plurality of data items stored across a plurality of storage devices, each storage device is associated with a performance tier;
collecting usage metrics for the plurality of data items, the usage metrics including one or more of: access frequency, access recency, file size, file growth rate, sequentiality, or temporal access pattern;
performing a plurality of tiering methods in parallel on the plurality of data items, each tiering method configured to process at least a subset of the collected usage metrics and to generate tiering recommendations for the plurality of data items, the tiering recommendations indicating whether at least one data item among the plurality of data items should be: (i) promoted to a higher-performance tier, (ii) demoted to a lower-performance tier, or (iii) retained in a current tier;
aggregating the tiering recommendations from the plurality of tiering methods to generate a consensus decision for each of the plurality of data items; and
in response to the consensus decision indicating promoting a data item among the plurality of data items to a higher-performance tier or demoting the data item to a lower-performance tier, performing a data tiering action that relocates the data item to a different storage device corresponding to the higher-performance tier or the lower-performance tier based on the consensus decision.

2. The computer-implemented method of claim 1, wherein performing each of the plurality of tiering methods outputs a numeric value within a bounded range,
a value below than a first threshold indicates a recommendation to demote a data item to a lower-performance tier,

a value above a second threshold indicates a recommendation to promote a data item to a higher-performance tier, and
a value between the first threshold and the second threshold indicates a recommendation to retain the data item in a current tier.

3. The computer-implemented method of claim 2, wherein the bounded range is symmetric about zero.

4. The computer-implemented method of claim 2, wherein aggregating the tiering recommendations comprises determining a weighted average of numeric values output by performing the plurality of tiering methods on a data item to generate an aggregated value indicating a consensus decision on the data item.

5. The computer-implemented method of claim 2, further comprising:
accessing a pre-defined policy specifying one or more of performance requirements or migration frequency thresholds;
dynamically adjusting the first threshold, second threshold, or weights of the plurality of tiering methods based on the pre-defined policy.

6. The computer-implemented method of claim 1, further comprising:
collecting performance metrics associated with data items before and after data tiering actions; and
determining a performance score of each of the plurality of tiering methods based on the collected performance metrics.

7. The computer-implemented method of claim 6, further comprising assigning a weight to each of the plurality of tiering methods based on respective performance scores, wherein aggregating the tiering recommendations includes giving different weights to different data tiering methods based on assigned weights.

8. The computer-implemented method of claim 1, wherein at least one of the plurality of tiering methods is performed in response to a data access event, and at least one tiering method is executed periodically based on historical usage metrics.

9. The computer-implemented method of claim 1, further comprising:
storing a history of consensus decisions for each data item,
identifying a trend in the consensus decisions over time; and
determining whether a data tiering action should be triggered further based on the identified trend.

10. The computer-implemented method of claim 1, wherein performing the data tiering action comprises scheduling relocation of the data item to occur asynchronously.

11. A non-transitory computer-readable storage medium storing instructions that when executed by one or more computer processors, cause the one or more computer processors to perform steps comprising:
monitoring usage of a plurality of data items stored across a plurality of storage devices, each storage device is associated with a performance tier;
collecting usage metrics for the plurality of data items, the usage metrics including one or more of: access frequency, access recency, file size, file growth rate, sequentiality, or temporal access pattern;
performing a plurality of tiering methods in parallel on the plurality of data items, each tiering method configured to process at least a subset of the collected usage metrics and to generate tiering recommendations for the plurality of data items, the tiering recommendations indicating whether at least one data item among the plurality of data items should be: (i) promoted to a higher-performance tier, (ii) demoted to a lower-performance tier, or (iii) retained in a current tier;

aggregating the tiering recommendations from the plurality of tiering methods to generate a consensus decision for each of the plurality of data items; and in response to the consensus decision indicating promoting a data item among the plurality of data items to a higher-performance tier or demoting the data item to a lower-performance tier, performing a data tiering action that relocates the data item to a different storage device corresponding to the higher-performance tier or the lower-performance tier based on the consensus decision.

12. The non-transitory computer-readable storage medium of claim 11, wherein performing each of the plurality of tiering methods outputs a numeric value within a bounded range, a value below than a first threshold indicates a recommendation to demote a data item to a lower-performance tier, a value above a second threshold indicates a recommendation to promote a data item to a higher-performance tier, and a value between the first threshold and the second threshold indicates a recommendation to retain the data item in a current tier.

13. The non-transitory computer-readable storage medium of claim 12, wherein the bounded range is symmetric about zero.

14. The non-transitory computer-readable storage medium of claim 12, wherein aggregating the tiering recommendations comprises determining a weighted average of numeric values output by performing the plurality of tiering methods on a data item to generate an aggregated value indicating a consensus decision on the data item.

15. The non-transitory computer-readable storage medium of claim 12, the steps further comprising:

accessing a pre-defined policy specifying one or more of performance requirements or migration frequency thresholds;

dynamically adjusting the first threshold, second threshold, or weights of the plurality of tiering methods based on the pre-defined policy.

16. The non-transitory computer-readable storage medium of claim 11, the steps further comprising:

collecting performance metrics associated with data items before and after data tiering actions; and determining a performance score of each of the plurality of tiering methods based on the collected performance metrics.

17. The non-transitory computer-readable storage medium of claim 16, the steps further comprising assigning a weight to each of the plurality of tiering methods based on respective performance scores, wherein aggregating the tiering recommendations includes giving different weights to different data tiering methods based on assigned weights.

18. The non-transitory computer-readable storage medium of claim 11, wherein at least one of the plurality of tiering methods is performed in response to a data access event, and at least one tiering method is executed periodically based on historical usage metrics.

19. The non-transitory computer-readable storage medium of claim 11, the steps further comprising:

storing a history of consensus decisions for each data item, identifying a trend in the consensus decisions over time; and determine whether a data tiering action should be triggered further based on the identified trend.

20. A computing system comprising:

one or more computer processors; and a non-transitory computer readable storage medium storing instructions that when executed by the one or more computer processors, cause the one or more computer processors to perform steps comprising computer-implemented method, comprising:

monitoring usage of a plurality of data items stored across a plurality of storage devices, each storage device is associated with a performance tier;

collecting usage metrics for the plurality of data items, the usage metrics including one or more of: access frequency, access recency, file size, file growth rate, sequentiality, or temporal access pattern;

performing a plurality of tiering methods in parallel on the plurality of data items, each tiering method configured to process at least a subset of the collected usage metrics and to generate tiering recommendations for the plurality of data items, the tiering recommendations indicating whether at least one data item among the plurality of data items should be: (i) promoted to a higher-performance tier, (ii) demoted to a lower-performance tier, or (iii) retained in a current tier;

aggregating the tiering recommendations from the plurality of tiering methods to generate a consensus decision for each of the plurality of data items; and in response to the consensus decision indicating promoting a data item among the plurality of data items to a higher-performance tier or demoting the data item to a lower-performance tier, performing a data tiering action that relocates the data item to a different storage device corresponding to the higher-performance tier or the lower-performance tier based on the consensus decision.

* * * * *